US012688641B2

(12) United States Patent
Francis

(10) Patent No.: US 12,688,641 B2
(45) Date of Patent: Jul. 21, 2026

(54) GRAPHIC RENDERING USING DIFFUSION MODELS

(71) Applicant: Dream3D, Inc., New York, NY (US)

(72) Inventor: Tony Francis, New York, NY (US)

(73) Assignee: Dream3D, Inc., New York, NY (US)

( * ) Notice: Subject to any disclaimer, the term of this patent is extended or adjusted under 35 U.S.C. 154(b) by 189 days.

(21) Appl. No.: 18/528,567

(22) Filed: Dec. 4, 2023

(65) Prior Publication Data

US 2024/0185498 A1     Jun. 6, 2024

Related U.S. Application Data

(60) Provisional application No. 63/430,238, filed on Dec. 5, 2022.

(51) Int. Cl.
| | |
|---|---|
| *G06T 15/00* | (2011.01) |
| *G06V 10/764* | (2022.01) |
| *G06V 10/77* | (2022.01) |
| *G06V 10/774* | (2022.01) |
| *G06V 10/82* | (2022.01) |

(52) U.S. Cl.
CPC ............ *G06T 15/00* (2013.01); *G06V 10/764* (2022.01); *G06V 10/7715* (2022.01); *G06V 10/774* (2022.01); *G06V 10/82* (2022.01); *G06T 2210/32* (2013.01)

(58) Field of Classification Search
CPC ..... G06T 11/40; G06T 15/00; G06T 2210/32; G06V 10/764; G06V 10/7715; G06V 10/774; G06V 10/82
See application file for complete search history.

(56) References Cited

U.S. PATENT DOCUMENTS

| | | | | |
|---|---|---|---|---|
| 12,322,068 B1* | 6/2025 | Kim | ........................... | G06T 5/60 |
| 2021/0158561 A1 | 5/2021 | Park et al. | | |
| 2021/0374384 A1 | 12/2021 | Munkberg et al. | | |
| 2022/0138455 A1 | 5/2022 | Nagano et al. | | |
| 2022/0284582 A1 | 9/2022 | Yang et al. | | |
| 2024/0005604 A1* | 1/2024 | Kreis | ...................... | G06T 19/20 |
| 2024/0087179 A1* | 3/2024 | Min | ........................ | G06T 11/00 |

(Continued)

OTHER PUBLICATIONS

Gafni, Oran, et al. "Make-a-scene: Scene-based text-to-image generation with human priors." European conference on computer vision. Cham: Springer Nature Switzerland, 2022. (Year: 2022).*

(Continued)

*Primary Examiner* — Alicia M Harrington
*Assistant Examiner* — Brianna Renae Cochran
(74) *Attorney, Agent, or Firm* — FENWICK & WEST LLP

(57) ABSTRACT

A system or method for generating computer graphics. One or more three-dimensional (3D) scenes are obtained and rasterized into a first set of two-dimensional (2D) images having a first resolution. Features are extracted from the first set of 2D images, and text prompts are generated based on the features. A diffusion model is applied to the features, and the text prompts to generate a second set of 2D images having a second resolution greater than the first resolution. The diffusion model is trained over a dataset comprising images and corresponding text descriptions to generate an image consistent with a text prompt. The second set of 2D images having the second resolution are caused to be rendered at a client device.

9 Claims, 7 Drawing Sheets

400B

Optionally, for each frame, individual depth maps can be passed.

(56) References Cited

U.S. PATENT DOCUMENTS

2024/0169479 A1 *  5/2024  Wang ..................... G06T 3/4053
2024/0185035 A1 *  6/2024  Yu ......................... G06N 3/0455

OTHER PUBLICATIONS

Singer, Uriel, et al. "Make-a-video: Text-to-video generation without text-video data." arXiv preprint arXiv:2209.14792 (2022). (Year: 2022).*

Tao, Ming, et al. "Df-gan: A simple and effective baseline for text-to-image synthesis." Proceedings of the IEEE/CVF conference on computer vision and pattern recognition. 2022. (Year: 2022).*

Ho, Jonathan, et al. "Video diffusion models." Advances in neural information processing systems 35 (2022): 8633-8646. (Year: 2022).*

Zhou, Daquan, et al. "Magicvideo: Efficient video generation with latent diffusion models." arXiv preprint arXiv:2211.11018 (2022). (Year: 2022).*

PCT International Search Report and Written Opinion, PCT Application No. PCT/US23/82366, Mar. 22, 2024, 12 pages.

* cited by examiner

100

Client Device
110

Gaming System
120

Network
140

Graphic
Generation
System
130

FIG. 4B

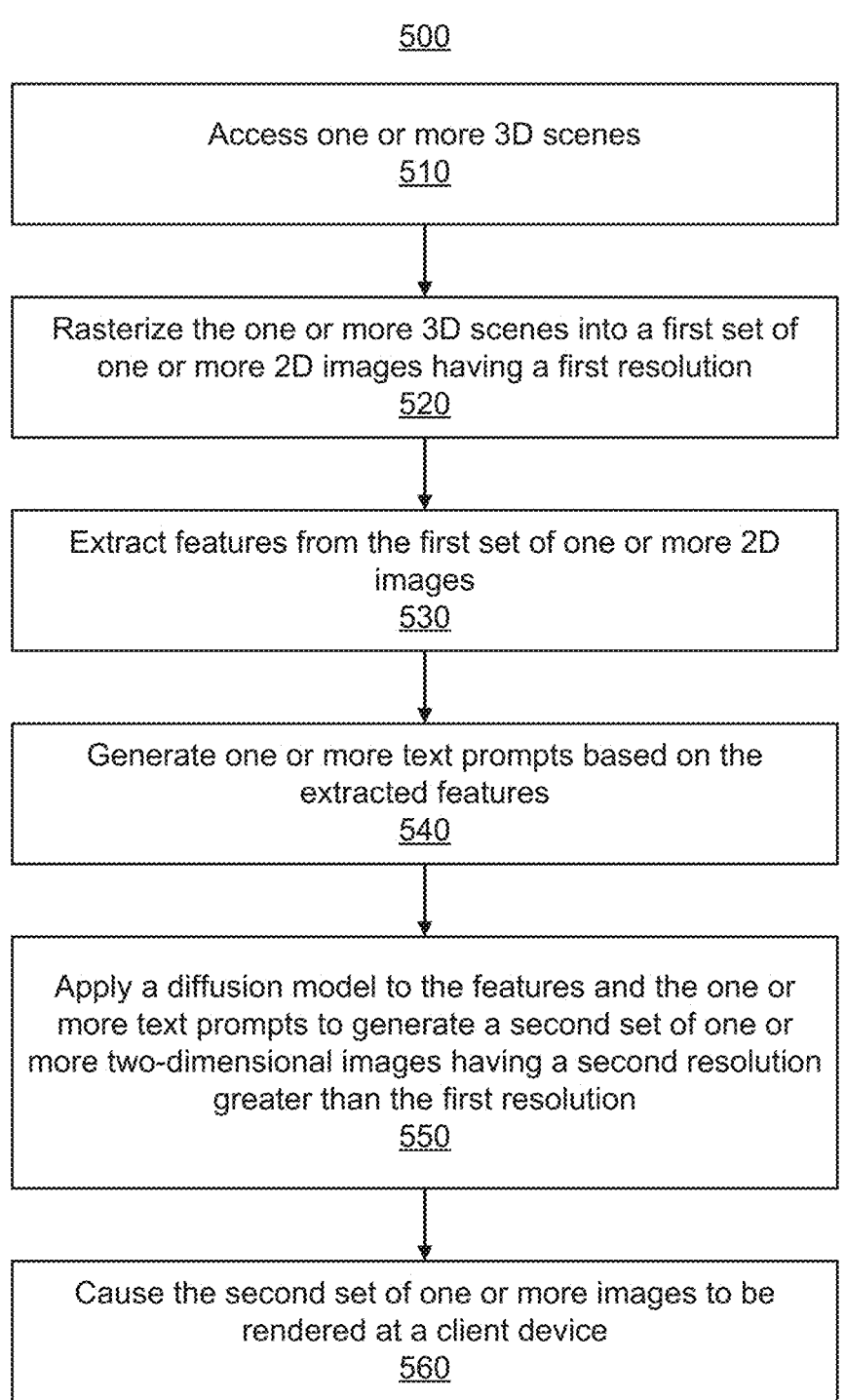

500

Access one or more 3D scenes
510

Rasterize the one or more 3D scenes into a first set of
one or more 2D images having a first resolution
520

Extract features from the first set of one or more 2D
images
530

Generate one or more text prompts based on the
extracted features
540

Apply a diffusion model to the features and the one or
more text prompts to generate a second set of one or
more two-dimensional images having a second resolution
greater than the first resolution
550

Cause the second set of one or more images to be
rendered at a client device
560

FIG. 5

GRAPHIC RENDERING USING DIFFUSION MODELS

CROSS-REFERENCE TO RELATED APPLICATIONS

This application claims the benefit of U.S. Provisional Application No. 63/430,238, filed Dec. 5, 2022, which is incorporated herein by reference in its entirety.

BACKGROUND

This disclosure relates generally to computer graphics, and more specifically to using generative artificial intelligence (AI) powered by diffusion models to generate computer graphics.

In computer graphics, the conversion from three-dimensional (3D) to two-dimensional (2D) involves a sophisticated translation layer. This layer interprets and processes the complex data of a 3D scene, such as the spatial positioning and relationships of objects within a virtual environment. The goal is to project this 3D information onto a 2D plane, essentially creating an image that is a representation of the scene as it would appear from a specific viewpoint.

In interactive applications and video games, this conversion isn't just a one-time process. Instead, it occurs continuously and rapidly, often in fractions of a second. This speed is essential to produce what is known as "real-time" content visuals that update promptly and smoothly in response to user inputs or environmental changes. The ability to render these graphics instantly is key to the immersive experience in video games and interactive simulations, where any delay or lag can disrupt the sense of realism and engagement.

A conventional method for this 3D-to-2D conversion heavily relies on simulation techniques, with ray-tracing being a prominent example. Ray-tracing simulates the way light interacts with objects in a scene to produce highly realistic images. It calculates the color of pixels by tracing the path of light as pixels in an image plane and simulating the effects of its encounters with virtual objects.

To achieve high-quality output through these simulation methods, there's a significant requirement for detailed construction and representation of various elements within the 3D scene. This includes precise modeling of objects, careful setting of lighting conditions, accurate material properties to determine how surfaces interact with light, and realistic physics to govern the motion and interaction of objects. The quality of these elements directly impacts the realism and visual appeal of the final 2D image.

SUMMARY

Unlike the conventional simulation-based rendering that requires high precision and realism in the underlying 3D scene, embodiments described herein replace simulation-based rendering with generative rendering powered by diffusion models. As such, the underlying 3D scene serves as a guiding suggestion rather than an exact one-to-one correlation with the output scene.

Embodiments described herein relate to a method or a system for generating computer graphics. The system accesses one or more three-dimensional (3D) scenes and rasterizes the one or more 3D scenes into a first set of one or more two-dimensional (2D) images having a first resolution. The system extracts features from the first set of one or more two-dimensional images. In some embodiments, the features are extracted via a convolutional neural network (CNN), and the features include 2D feature maps.

The system also generates one or more text prompts based on the extracted features. In some embodiments, the system identifies an object (e.g., a car) based on the extracted features, and generates a text prompt corresponding to the object. In some embodiments, the system identifies an environment based on the extracted features, and generates a text prompt corresponding to the environment. The system applies a diffusion model to the features and the one or more text prompts to generate a second set of one or more images having a second resolution greater than the first resolution, and causes the second set of one or more images to be rendered at a client device. The diffusion model is trained over a dataset comprising images and corresponding text descriptions to generate an image consistent with a text prompt.

In some embodiments, for each text prompt, the system generates a set of prompt embeddings based on the prompt and generates a set of latent variables based on the features associated with the prompt. The diffusion model is applied to the set of prompt embeddings and the set of latent variables to generate the second set of images.

In some embodiments, the diffusion model includes a 3D Unet adapted from a pretrained 2D Unet. The 3D Unet is configured to receive a sequence of 2D images as input to generate a second sequence of 2D images as output, with sequence as a third dimension of data. As such, the diffusion model is able to perform video-to-video generation.

To achieve near real-time video-to-video generation, in some embodiments, the system samples the first sequence of 2D images at different times, and applies the diffusion model to the sampled sequence. To achieve continuity, in some embodiments, the system selects and processes a first subset of the first sequence of 2D images, and a second subset of the first sequence of 2D images, where the first and second subsets overlap each other.

BRIEF DESCRIPTION OF THE DRAWINGS

FIG. 4B illustrates another example process of generating computer graphics in accordance with some embodiments.

FIG. 5 is a flowchart of a method for generating computer graphics in accordance with some embodiments.

Figure 1:
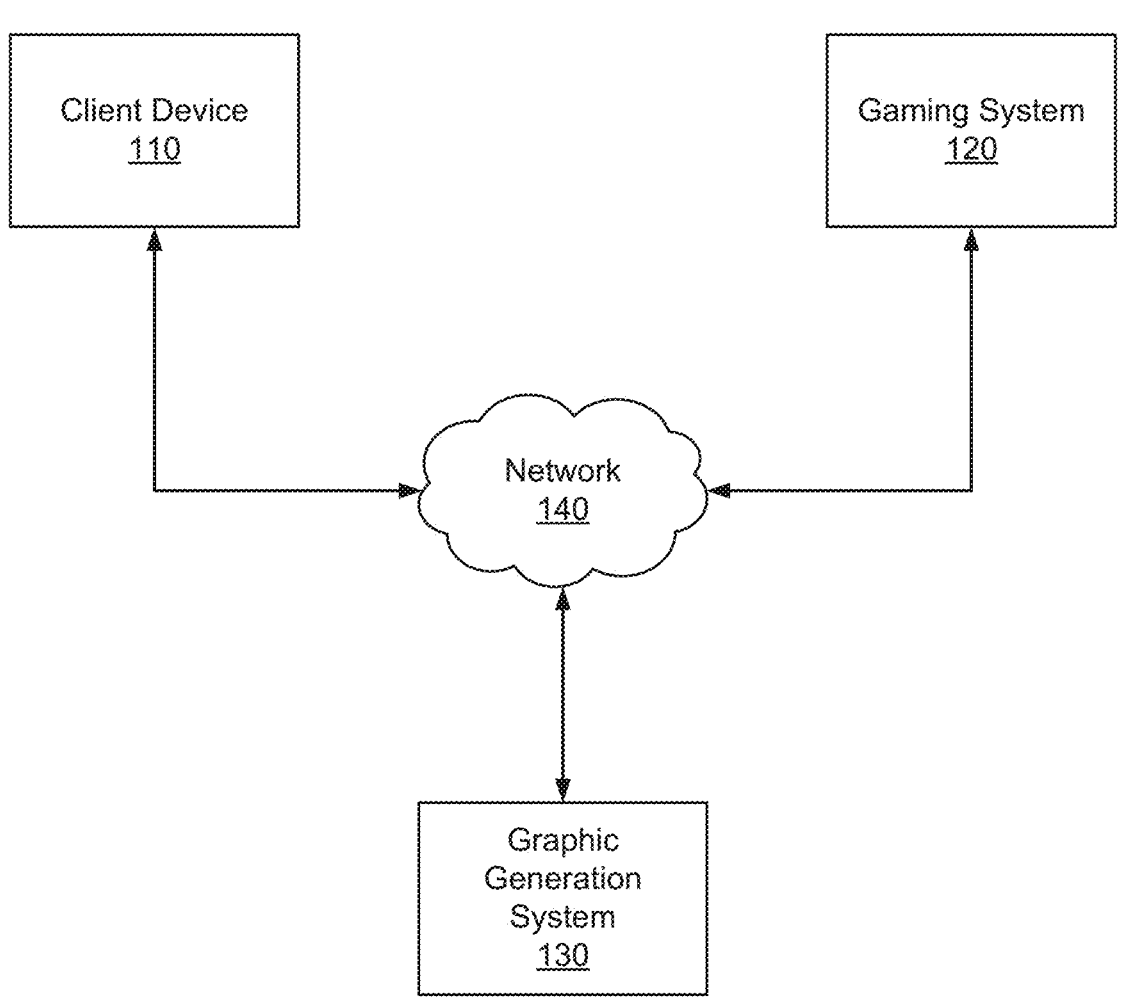
FIG. 1 is a block diagram of an example system environment in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Traditional methods of generating computer graphics, particularly in interactive and gaming content, involve translating structured data of a 3D scene into a 2D image in real-time. This translation typically requires simulation techniques like ray-tracing, demanding high accuracy in the representation of objects, lighting, materials, and physics.

Unlike the traditional methods, embodiments described herein relate to new methods and/or systems of generating computer graphics, using generative artificial intelligence (AI) powered by diffusion models. This method uses a 3D scene as a suggestive prior rather than a direct mapping, allowing for more creative and flexible rendering. In some embodiments, the 3D scene is captured by a client device of a user. A diffusion model receives the 3D scene as input to generate computer graphics (e.g., gaming content) as output. In some embodiments, the diffusion model is a text-to-image (T2I) model. The T2I model is trained over a dataset comprising images and corresponding text descriptions. Responsive to receiving a text prompt, the T2I model is trained to generate an image consistent with the text prompt.

23. The T2I model is a generative model that is trained to generate images from text prompts. The process of training a T2I model includes at least two stages, namely forward process (also referred to as "adding noise") and reverse process (also referred to as "removing noise"). During forward process, the model starts with an image and gradually adds noise to it over a series of steps, eventually turning it into a random noise. This process resembles the physical process of diffusion, where particles move from areas of higher concentration to lower concentration over time. In the reverse process, the model learns to remove the noise and reconstruct the original image from the noisy state. During training, the model is taught to predict the noise that has been added to an image and then reverse this process. By doing so, it can generate new images by starting with random noise and iteratively removing the noise to create a coherent image. In some embodiments, the T2I model is trained over a dataset, including examples of images and their corresponding text descriptions. In some embodiments, the T2I model is trained over a dataset of images and features that correspond to and can be extracted from a 3D scene, e.g., predicted depth maps. The T2I model learns to associate specific words and phrases with visual patterns, shapes, colors, and compositions found in the images. The T2I model is able to understand and interpret text descriptions and then use this understanding to guide the de-noising process to generate an image that matches the text description.

Example System Environment

24. FIG. 1 is a block diagram of an example system environment 100 in accordance with some embodiments. the environment 100 includes one or more client device(s) 110, one or more gaming system(s) 120, and a graphic generation system 130 configured to communicate with each other via a network 140. The client device 110 may be any hardware used by a player to access and interact with a game. The game may be hosted on the gaming system 120 or downloaded locally. The client device 110 may communicate with the gaming system 120 or run the game locally (in offline games).

In some embodiments, the rendering process can be remote, such that the client device 110 is only responsible for receiving a video stream and sending structural scenes. Such embodiments are particularly beneficial for scenarios where the model is either too large or not sufficiently rapid to operate on a local system of the client device 110.

The client device(s) 110 can encompass a variety of hardware used for gaming. This includes desktops and laptops, which are capable of running games on their own or connecting to the gaming system 120 for online gaming experiences. Additionally, client device(s) 110 might comprise mobile devices like smartphones and tablets, which support mobile gaming either independently or by linking to the gaming system 120 for online interactions. The range of client devices extends to dedicated gaming consoles and portable gaming devices, designed specifically for gaming purposes. Another notable inclusion is virtual reality headsets, providing immersive gaming experiences. Smart TVs and streaming devices also form part of the client device(s) 110, offering the ability to play games directly or stream them from other devices. In the context of online gaming, client device 110 is typically responsible for rendering the game's graphics, processing user inputs, and sometimes handling a portion of the game's logic. It maintains communication with the gaming system 120, which is tasked with managing the overall state of the game, ensuring data synchronization among players, and handling computations essential for the game mechanics.

In some embodiments, the graphic generation system 130 is configured to access one or more three-dimensional (3D) scenes, and rasterizes the 3D scenes into a set of 2D images (also referred to as a first set of 2D images). In some embodiments, the 3D scenes may be obtained from the client device 110. For example, the client device 110 may have a depth camera configured to capture depth maps of an environment. Alternatively, the 3D scenes may be received from the gaming system 120. For example, the gaming system 120 may be able to receive 2D images from the client device 110 and reconstruct a 3D scene based on the 2D images. The 3D scenes obtained from the client device 110 or gaming system 120 may have a fairly low resolution. Thus, the first set of 2D images often also have a fairly low resolution. The graphic generation system 130 extracts features from the first set of 2D images and generates one or more text prompts based on the extracted features. The graphic generation system 130 applies a diffusion model to the features and the one or more text prompts to generate a second set of 2D images having a higher resolution, and causing the second set of 2D images to be rendered at the client device 110. As such, the underlying 3D scene serves as a guiding suggestion rather than an exact one-to-one correlation with the output images.

In some embodiments, the graphic generation system 130 is a part of the gaming system 120 and is configured to generate a gaming environment. Alternatively, the graphic generation system 130 is a separate system from the gaming system 120, configured to communicate with the gaming system 120 and the client device 110 via the network 140 and generate computer graphics for a gaming environment of the gaming system 120.

The network 140 may include any combination of local area and/or wide area networks, using either wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

Example System Architecture

Figure 2:
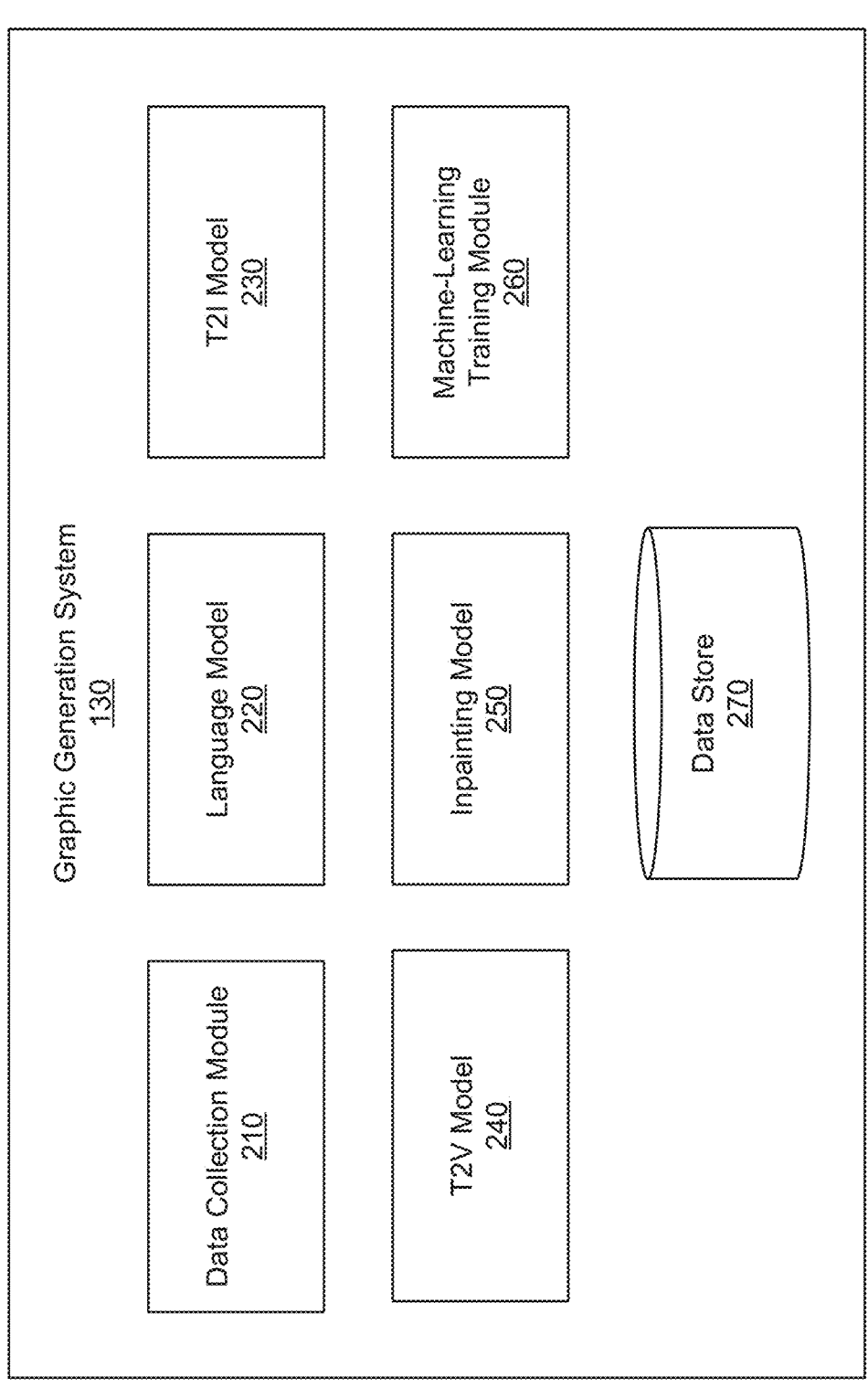
FIG. 2 illustrates an example architecture of the graphic generation system, in accordance with some embodiments.

FIG. 2 illustrates an example architecture of the graphic generation system 130, in accordance with some embodiments. The graphic generation system 130 includes a data collection module 210, a language model 220, a text-to-image (T2I) model 230, a text-to-video (T2V) model 240, an inpainting model 250, a machine-learning training module 260, and a data store 270. In alternative embodiments, different and/or additional components may be included in the graphic generation system 130. For example, in some embodiments, the graphic generation system 130 may also include (but is not limited to) an image-to-image model, a video-to-video model, an image-to-video model, an image-to-3D model, a text-to-3D model, a neural renderer, a volumetric renderer, a neural volume model, and/or a mesh extraction model.

The data collection module 210 is configured to collect data from the client device 110 and/or the gaming system 120. For example, a sequence of 3D scenes may be obtained from the client device 110, and gaming context may be obtained from the gaming system 120. The language model 220 is an artificial intelligence (AI) model trained to understand, interpret, generate, and respond to natural language. In some embodiments, the language model 220 is configured to process a dataset comprising image captions. In some embodiments, the language model 220 is configured to generate a text embedding for each image caption and cluster the text embeddings into multiple areas. Different clustering methods may be used to cluster the text embeddings. In some embodiments, k-means clustering method is implemented. Once the text embeddings are clustered into different areas, the system 130 is able to find underrepresented areas that have fewer text embeddings (corresponding to fewer images). In some embodiments, the system 130 can obtain or produce more images in these underrepresented areas. These images and their corresponding captures can then be used to train the T2I model 230.

The T2I model 230 is a diffusion model trained to create images based on both an image and a text description. In some embodiments, this model takes the text input (such as a sentence or a phrase) and an image feature input (such as color, depth, normal, diffuse, metallic, edge map, or model features extracted from an image rasterized based on a 3D scene captured by a client device 110), and generates an image that visually represents the content described in the text. In some embodiments, the text input is not strictly necessary. In some embodiments, the T2I model 230 is configured to extract features from a 2D image. A text description may then be determined based on the extracted features. In some embodiments, the T2I model 230 uses the language model 220 to generate a text embedding for a given text description. The T2I model 230 uses text embedding as guidance to ensure that a generated image is relevant to the text description. When generating an image, the T2I model 230 performs a learned reverse diffusion process over the original image, conditioned on the text embedding. At each step, the T2I model 230 predicts and substracts a bit of noise, gradually refining the image until a clear image that corresponds to the text description emerges.

The T2V model 240 is configured to take a sequence of images (e.g., video) as input to generate a sequence of images (e.g., video) as output. In some embodiments, the T2V model 240 uses the T2I model 230 to process each image in the sequence. In some embodiments, the T2V model 240 is adapted from the T2I model 230 adding an additional sequence dimension.

The inpainting model 250 is an AI model trained to fill in missing parts of images, such as filling in background or generating partial image content that is coherent with the surrounding areas. The machine-learning training module 260 is configured to train or fine-tune the language model 220, T2I model 230, T2V model 240, and/or inpainting model 250 using training data stored in the data store 270. In some embodiments, the inpainting model 240 is applied to the 3D scenes obtained from the client device 110 or the gaming system 120 to fill the gaps in those images. In some embodiments, the inpainting model 240 is applied to images generated by the T2I model 230 to fill in missing parts in those images. The resulting images from T2I model 230, T2V model 240, and/or inpainting model 250 are then presented to the client device 110 for display. In some embodiments, inpainting model 250 is not required. Additional details about using and training language model 220, T2I model 230, and T2V model 240 are further described below. Additional details about using and training language model 220, T2I model 230, and video2video model 240 are further described below.

Training & Utilizing T2I Model

The T2I model 230 is a neural network that takes additional information (also referred to as "conditions") into account when generating outputs. Conditioning refers to a process where the output of the network is dependent not just on the input data, but also on some external information or parameters. Here, the conditioning information for the T2I model may include features extracted from a 2D image. The T2I model 230 described herein has a robust understanding of text, produces unbiased results, and generates coherent images across a wide range of subjects.

In some embodiments, the T2I model 230 includes a hypernetwork and one or more auxiliary layers. Traditionally, the training of hypernetworks or auxiliary layers often involves using open image datasets like Large-scale Artificial Intelligence Open Network (LAION). During this training, pairs of features and images are extracted from the dataset. However, simply training a hypernetwork on a raw dataset might lead to distribution drift, where the types of images produced are biased toward specific subjects or environments. This can also negatively impact the quality of the T2I model.

Unlike traditional training methods, the T2I model 230 described herein is trained via a more complex process to address these challenges. In some embodiments, training the T2I model described herein includes using a language model 220, a dataset comprising image captions to create new images with a T2I model, and/or a synthetic dataset. In some embodiments, an existing T2I model is used to generate images (also referred to as "auxiliary images"), features are extracted from these images, and new layers are introduced to take the auxiliary images as additional condition input. These new layers are trained to reproduce generated images (also referred to as "target images") given the extracted feature images (with or without their original prompts). After generating these images, features are extracted from them. This method provides an accurate representation of what the model would produce given a specific caption, serving as a reliable ground truth.

To further enhance the model's capabilities, tokenized and vectorized representations of the captions are clustered, for instance using k-means clustering. This clustering helps in two significant ways, including identifying underrepresented areas in the image space where current data is lacking, and ensuring that the control model is trained across a broad spectrum of images, thereby improving its diversity and effectiveness.

Another advantage of this approach is the conditioning of additional 2D feature maps, specifically those extracted from 3D data. This method allows for a richer and more nuanced training process. By integrating feature maps derived from 3D data, the T2I model 230 can achieve a deeper understanding of spatial relationships and object interactions within images. This not only enhances the quality of the generated images but also broadens the model's capability to interpret and render complex scenes accurately.

In some embodiments, the language model 220 is configured to generate prompt embeddings for each image caption. In some embodiments, the prompt embedding may be a token, which is a numerical form also referred to a tokenized and/or vectorized representation of the caption. In some embodiments, tokenized and/or vectorized representations of the captions are clustered. In some embodiments, the clustering of the tokens of the captions may be performed via k-means clustering method. The clustered captions (or their corresponding tokens or vectors) are then sampled to find underrepresented areas of image space that currently lack data points. Additionally, the sampling aims to ensure that the model is exposed to and trained on a broad spectrum of images, enhancing its diversity and coverage.

In some embodiments, the T2I model is conditioned on additional 2D feature maps. In some embodiments, the 2D feature maps are extracted from 3D data. In some embodiments, the T2I model applies prompts for regions based on control information. For each prompt, the model creates a new set of latents (also referred to as latent variables or latent features) and prompt embeddings.

The latents are not directly observable or measurable but can be inferred from other, directly observable data. In neural networks, especially deep learning models, latents may include internal representations that the network learns. These representations are the activations of the neurons at various layers of the network, encoding complex patterns and features extracted from the input data. In generative models or image generation models, latents may include internal states of the model that capture the essence of the data it has been trained on, allowing it to generate new, unseen outputs that resemble the training data.

The language model 220 is also applied to a prompt to generate prompt embeddings or prompt tokens, which is a vector representation of the prompt (or input texts). Each prompt token (word or part of a word) is mapped to a high-dimensional space where similar words have similar representations. These embeddings capture the semantic and syntactic properties of the prompt.

The latents and the prompt embeddings are then processed by the T2I model. In some embodiments, the latents and prompt embeddings are combined into a single batch, and the single batch is further processed to improve processing speed.

In some embodiments, the latents are combined by taking a weighted average with their masks. For example, a car in a scene has a first prompt (also referred to as a car prompt), and the total scene has a second prompt (also referred to as an environmental prompt). A first set of text embeddings for the car prompt is obtained, and a second set of text embeddings for the environment prompt is also obtained. In some embodiments, a first set of latents are obtained for the car, and a second set of latents are obtained for the environment. Alternatively, the latents may be implicit, i.e., not directly defined or specified. In some embodiments, the latents are learned by the T2I model through the process of optimization and by identifying patterns in the data. In some embodiments, the T2I model learns to represent different aspects or parts of the images within different sections of the latent space. For example, one region of the latent space might correspond to background of images, while another might correspond to foreground objects. In some embodiments, multiple latents may be combined into a merged latent, which can then be used to generate outputs.

In some embodiments, the first and/or second sets of latents are obtained randomly. The first and second sets of text embeddings and the first and second sets of latents are batched into a batch and processed through the T2I model. After that, latents for the car and the environment are unbatched from the output. A car bit mask is applied to the latents for the car, and an environment bit mask is applied to the latents for the environment. In some embodiments, a weighting factor is also applied to the latents, such that the latents are not purely 0 in the masked-out regions. The resulting latents are then averaged to produce a single combined latent for a diffusion step.

In some embodiments, the bit masks for the car and the environment are produced from a 3D scene where certain conditioning information is applied. For example, if a conditioning model is trained for edge maps and the 3D scene is mostly empty, the desired result is for the rest of the scene to be filled by the diffusion model, which is indicated by conditioning information.

In some embodiments, the masks are interpolated to match the spatial dimensions of each output block of the control hypernetwork or the output block of the additional control layers. In some embodiments, in the diffusion process, the masks are applied to target layers such that certain control information is only applied to the desired regions of the image.

Training & Using Video Models

In some embodiments, the T2I model 230 is extended to have a temporal dimension as a text-to-video (T2V) model 240. In some embodiments, the T2V model 240 reuses T2I control (which is a module of the T2I model 230) by batching the frame sequence dimension and applying control frame by frame. In some embodiments, the T2V model 240 has a new T2V control. The new T2V control may be generated by taking the existing T2I control and adding temporal layers and a temporal dimension and fine-tuning with video datasets. In some embodiments, the T2V control is trained from scratch.

In some embodiments, the T2V model 240 is trained to take in a first sequence of images and produce a second sequence of images. In some embodiments, the T2V model is trained to take in a start frame and produces a sequence of images. In some embodiments, the T2V model 240 is trained to take in a sparse sequence of images and produces a full sequence of images. In some embodiments, the T2V model is trained to interpolate frames in a given sequence. In some embodiments, the T2V model is trained to take a previous frame and produce a next frame.

In some embodiments, the T2V model 240 is a 3D model configured to take a sequence of images (e.g., video) as input to generate a sequence of images (e.g., video) as output, where a sequence is a third dimension in addition to a width and a height of each image.

In some embodiments, a 2D T2I model is applied to each frame, and each frame is treated as a separate image. While this is adequate for capturing general details, it is more beneficial to understand how motion is depicted in a canny map across multiple frames. This allows the model to acquire knowledge about phenomena like optical flow, as represented in various feature maps.

In some embodiments, a pretrained 2D T2I model is extended to 3D by adding layers to represent a sequence of images to diffuse over and condition on. For example, in some embodiments, the pretrained 2D T2I model may include a 2D Unet. The 2D Unet in the 2D T2I model may be modified, by adding additional layers, to generate a 3D Unet. The 3D Unet is able to take advantage of the quality and diversity of the 2D T2I model.

In some embodiments, to establish context based on 3D data, a scene is rasterized. Rasterizing a scene is a process in computer graphics that converts vector graphics (which represent images using geometric shapes like lines and curves) into raster graphics (which represent images as a grid of individual pixels). This process is fundamental in rendering a 3D scene onto a 2D display, such as a computer monitor or a mobile device screen. For each frame of the scene, feature maps are generated. Movement of objects within the scene can be interpolated either manually, through a language model, or via a motion diffusion model. This interpolation aids in creating authentic conditioning data for the diffusion process.

In some embodiments, a rasterized scene is represented via a multi-dimensional dataset, including a batch dimension, a channel dimension, a frame dimension (also referred to as a "sequence" dimension), a height dimension, and a width dimension. The batch dimension represents a number of samples in a batch. Frame dimension represents a number of frames or time steps in each sample. Channel dimension corresponds to a number of channels in the data. For images, they may refer to color channels, e.g., 3 for RGB images and 1 for grayscale. The height dimension represents a height of an image. Weight dimension represents a width of an image.

In some embodiments, the frame dimension (or sequence dimension) of the dataset (also referred to as a "first dataset") is projected into the batch dimension to generate a second dataset. In some embodiments, the 2D T2I model is applied to the second dataset. Frame dimension is then projected back into their original form.

For example, the first dataset denoted (batch, channels, frames, height, width) is reprojected to a second dataset denoted (batch*frames, channel, height, width), where the frame dimension is projected into the batch dimension. The 2D T2I model is applied to the second dataset (batch*frames, channel, height, width) to generate an output dataset (batch, channels, frames, height, width), where the frame dimension is projected back into its original form.

The above-described methods are merely some examples of reusing a previously trained 2D T2I model, instead of training a new 3D T2I model from scratch for videos. Additional methods may also be implemented to reuse a previously trained 2D T2I model. In some embodiments, the pretrained 2D T2I model includes another neural network, an autoencoder, and/or a visual transformer network.

Alternatively, or in addition, 3D T2I models can be trained similarly to a 2D T2I model by training on a sequence of images and feature pairs. Training a 3D T2I model on the sequence of images can capture additional temporal data to improve output coherence.

One of the challenges in maintaining coherence over extended sequences is the limitation in the number of frames or 'lanes' that can be processed concurrently in a Graphics Processing Unit (GPU). For example, the system might be restricted to diffusing eight frames at a time. However, for a longer sequence, like 24 frames, a simplistic method would involve diffusing the first eight frames, then moving to the next set, and so on. This approach, however, can lead to inconsistencies due to the non-deterministic nature of diffusion models and varying control information across frames. This can result in different parts of the 'lane space' being affected differently.

To mitigate the above-described problem, one embodiment includes creating an overlap between chunks. For instance, the system could diffuse the first six frames and then use the last four frames of this set to initiate the diffusion of the next set. This batch-overlap method adds some coherence, but may still present challenges as the system moves away from the original chunk, leading to potential divergence. Another embodiment includes having the T2V model 240 trained specifically to predict a next N frames from a given start frame or a set of start frames. The predicted frames can be conditioned on additional features, such as (but not limited to) color maps, diffuse maps, normal maps, bump maps, flow maps, camera matrices, etc. A color map defines a base color of an object's surface. A diffusion map is a texture map that defines the diffuse reflection of the surface. A normal map adds details to a surface without adding more polygons. A bump map creates an illusion of depth on a surface. A flow map is used to simulate flowing materials, like water, hair, or grass, in a 3D environment. In 3D graphics and computer vision, a camera matrix describes the properties and behaviors of a camera in a 3D space, such as position, orientation, focal length, and other intrinsic properties of a camera.

Another embodiment includes sampling different strides, where, instead of processing contiguous chunks of frames, the system selects and diffuses frames at intervals, then stitches them together later. This method can offer greater coherence over a 24-frame sequence, though it might limit the motion that can be captured, especially if control information isn't available for the entire sequence.

An alternative embodiment includes varying the sampling from the latent states. This could mean diffusing some frames for a portion of the steps, then switching to another set for the remaining steps, and focusing on overlapping middle sections or back-to-back frames in different sequences. Different sampling methods may be implemented to allow for effective diffusion while addressing coherence issues.

An additional challenge in this context is the constraint in resolution, which again ties back to the GPU's capacity limitations. One embodiment employs a multistage rendering process. Initially, the system might render a longer sequence at a lower resolution to capture broader scene coherence, and then proceed with steps to upscale the rendering. This could involve diffusing over lanes at a resolution like 512×512 and then naively upscaling it to 1K or 2K. Upscaling can be done by either directly interpolating the latent tensor (e.g., using bilinear interpolation) or by converting it into an image, scaling it up in the image space, and then re-encoding it with Variational AutoEncoders (VAEs) to achieve higher resolution lanes.

In some embodiments, each frame is upscaled using latent upscaling in the namespace, which can be achieved through various methods, such as diffusing the upscaled version further with the same prompts and conditioning. Control information can be used to enhance accuracy and coherence, by extracting additional grounding data from the produced frame.

However, a common issue is the loss of coherence due to the absence of finer details in the upscaled frames. To address this, in some embodiments, a temporal module is used to predict the subsequent frame based on previous ones, utilizing tools like flow maps or optical flow. Alternatively, in some embodiments, the 3D UNet model may be adapted to operate on a smaller number of frames, such as two or three, allowing it to function at a higher resolution.

In some embodiments, frames are sub-sampled and then interpolated to adjust the frame rate of a video or animation sequence to a desired level. For instance, in some embodiments, the system may render the sequence at 8 frames per second (fps) and then employ an interpolation model to reach the desired frame rate. The interpolation may be achieved by utilizing optical flow, a technique for estimating the motion of objects between frames, which can be particularly useful for creating smooth transitions. Another approach is latent interpolation, which involves manipulating the underlying latent representations of the frames to generate intermediate frames.

In some embodiments, the T2I model 230 can be paired with a temporal model to predict intermediate frames. This can be done in two ways: either by using only the previous frames or by using both the previous and next frames to predict the intermediate frame. This approach helps in creating more accurate and coherent interpolations, especially in sequences with complex motion or changes.

In some embodiments, a T2V model is fine-tuned on an interpolation task, such that the T2V model can also be employed to fill in frames. This method is somewhat akin to the latent sampling strategies but with an added advantage: global coherence is largely maintained since the video model inherently accounts for the entire sequence. This results in a more seamless and consistent output, which is particularly important in longer sequences or where maintaining narrative and visual continuity is crucial.

Further, in some situations, the limitations in the underlying control information present a significant challenge in frame-by-frame video processing or animation. When detailed control information for each frame is used, there can be a restrictive emphasis on the precise properties of specific objects, such as their position, scale, rotation, and color. For instance, if the system needs to animate a human walking across the screen, using pose information to condition each frame would require meticulously animating the gait of the human figure. This level of detail can be both time-consuming and technically demanding, particularly in complex scenes.

To address the above-described problem, a method called "control density" can be utilized. This method includes selectively dropping out control information, either across the entire frame or within specific masked regions. By varying the control density in a range between 0 and 1, different levels of control information are applied. A control density of 1 means every frame utilizes full control information, while at 0, only the first and last frames are controlled, leaving the model to interpolate and interpret the intermediate motion of objects. This method allows for a more fluid and natural motion in animations, as the system has the flexibility to fill in the gaps, reducing the need for exhaustive detail in the control data.

This dropout of control information (also referred to as "sparse control") can also be implemented at the rasterization step. It is worth noting that this sparse control can be a part of a T2V control training process to improve its performance as opposed to implementing it at runtime. For example, if only start and end keyframes are available, the control information can be deliberately omitted per object or globally in the conditioning information. This is done instead of interpolating the motion of the objects in the scene and then applying a control density variable. By managing the control information in this way, the model is given the autonomy to interpret the motion between keyframes, potentially leading to more dynamic and realistic animations. This approach streamlines the animation process, especially for sequences requiring complex movements or where detailed control information is not readily available.

Extending to Real-Time

In the context of real-time content creation, such as for video games, there are several notable challenges. One of these is achieving long-term coherence in expansive scenes. Typically, once an environment is designed and ready to be exported to a game, it encompasses both the underlying control information, like boxes and 3D models, as well as associated prompts. Transforming this into a video format is one thing, but extending it to real-time content adds layers of complexity, especially in terms of managing speed, novel viewpoints, and user interactions. Ensuring that the visual and interactive elements remain consistent and fluid over extended periods or throughout complex sequences is crucial for immersive experiences, but it's also technically demanding, especially when aiming for real-time performance.

Another significant challenge lies in reducing latency, particularly when user interaction and environmental feedback are involved. In interactive applications, such as virtual reality or augmented reality, the system must respond to user inputs or changes in the environment almost instantaneously to maintain immersion and realism. High latency can disrupt the user experience, breaking the illusion of interactivity and responsiveness that these technologies strive to create.

Physics simulations add another layer of complexity. The development of physics diffusion models marks a significant advancement in this area. These models are designed to predict the deformation of objects in a virtual environment, taking into account various factors such as physical primitives, previous visual information, and specific features. By accurately modeling how objects interact with each other and their environment, physics diffusion models can greatly enhance the realism of virtual worlds. However, integrating these models effectively while maintaining speed and reducing latency is a challenging task that requires a delicate balance between computational efficiency and physical accuracy. The ultimate goal is to create digital environments that are not only visually stunning but also behave in a way that is consistent with the real world, making them more believable and engaging for users.

To address the challenges of real-time content creation, several solutions can be implemented. Each of these solutions aims to balance the demands of visual fidelity, computational efficiency, and interactive capabilities.

One method is to use smaller, fine-tuned diffusion models that are specifically tailored to represent a particular scene. This method involves creating a model that can handle the unique characteristics and requirements of the scene, ensuring both efficiency and accuracy. Alternatively, adding new layers to the original model for that particular scene can also be effective. These new layers can then be configured to respond to various scene-specific variables, such as the time of day, the current camera matrix, positions of characters, or more complex, high-dimensional features that encapsulate the world's state. This could include aspects like a character's visual representation in latent space or an amalgamation of various world features within the latent space. These modifications allow the model to adapt to the specific dynamics and nuances of the scene, providing a more tailored response to the environment.

In some embodiments, fine-tuning a smaller diffusion model based on a particular scene includes generating a number of training videos for that particular scene, ensuring coherence across all sub-frames, which could be around 24 frames long. This extensive dataset, along with the conditioning information from various viewpoints, is then used to fine-tune the diffusion model. The goal is to consistently produce the expected output for any given viewpoint within the scene.

Another method is to vary the underlying scene information. This variation allows the model to adapt if something novel occurs, like an object moving. The multiple viewpoints created in the original environment aid this process. For example, if a car is moved to the left in the scene, a mean square error assertion can ensure that the car still appears consistent from the new viewpoint. This adaptive rendering is effective in maintaining visual consistency, especially in dynamic, real-time environments.

Another method involves the use of neural representations of the scene that are pre-baked. These can be in 3D, 4D, or even 5D formats, depending on the complexity and requirements of the content. By pre-processing and encoding the scene in these neural representations, the computational load during real-time rendering can be significantly reduced, while still maintaining a high level of detail and realism.

Another method includes integrating advanced neural network models with traditional 3D graphics and physics engines, such as just running the T2I model 230 or the T2V model 240 in real time, which can offer the benefits of both worlds. This hybrid approach leverages the strengths of neural networks in generating realistic textures and effects, while relying on conventional 3D graphics for robust, tried-and-tested rendering and physics simulations.

In some embodiments, 8-bit quantization is implemented on the diffusion model. This process involves reducing the precision of the model's computations, which can significantly decrease the computational resources required. This reduction in precision often has a minimal impact on the visual quality but can lead to substantial improvements in performance.

In some embodiments, the limitations imposed by Graphics Processing Unit (GPU) Video Random Access Memory (VRAM) are addressed by optimizing models and rendering techniques to be more memory-efficient, such that it's possible to produce high-quality content without exceeding the available VRAM, thus avoiding potential performance bottlenecks.

In some embodiments, instead of rendering every frame (such as 24 frames per second), a more resource-efficient approach is to sub-sample and interpolate frames. For example, the system could render at 8 frames per second and then use sophisticated interpolation methods to fill in the remaining frames, achieving the desired frame rate. This method reduces the computational load while still providing smooth and visually appealing results.

Each of the described embodiments is able to tackle the complexities of real-time rendering, striking a balance between realism, computational demands, and the need for interactive experiences.

Combine with Traditional 3D Graphics and Physics Engine

In some embodiments, the T2I model 230 is combined with traditional 3D graphics and a physics engine. Combining advanced video diffusion models with traditional 3D graphics and physics engines represents a significant evolution in game development, blending the latest in AI-driven technology with well-established 3D rendering techniques. This hybrid approach maintains the core processes of traditional game creation but introduces new efficiencies and creative possibilities, particularly in the handling of input models and rendering.

In this approach, the foundational work of building a game remains largely the same. However, there's a notable reduction in the constraints regarding the quality of the input models. Developers can work with less detailed, simpler models without compromising the final output's visual fidelity. This flexibility can lead to significant savings in both time and resources during the game development process.

The method starts with the usual rasterization of the scene, which involves converting 3D models into a format suitable for 2D display, like a computer screen. This step is followed by feature extraction, where key visual elements and characteristics of the scene are identified and cataloged. These features are used for the next stage of the process.

Once rasterization and feature extraction are complete, the extracted features are fed into the input of a video diffusion model (e.g., the T2I model 230 or T2V model 240). This model is responsible for processing the features and generating the final visuals that will be displayed to the user. The output of the diffusion model essentially determines the look and feel of the game's graphics, offering potentially higher-quality and more artistically varied renderings than traditional methods alone.

In a gaming context, the diffusion model is capable of rendering frames at speed conducive to real-time or near-real-time playback, such that most users cannot feel the latency in the gaming environment. In some embodiments, the diffusion model is capable of rendering at a minimum speed of $\frac{1}{24}$th of a second per frame. Achieving this speed enables maintaining the fluid, immersive experience that modern games provide.

By combining the strengths of traditional 3D graphics (such as reliable physics simulations and robust rendering capabilities) with the innovative features of video diffusion models (like enhanced visual quality and style flexibility), this approach opens up new horizons in game development. It allows for the creation of games that are not only visually stunning but also more efficient and versatile in their production.

The integration of video diffusion models with traditional game development techniques offers a range of benefits and novel capabilities, significantly impacting the process of game creation in terms of both efficiency and artistic freedom.

One of the advantages of this approach is the reduced reliance on ray tracing and highly detailed assets for achieving photorealism. This shift can dramatically lower both hardware requirements and the cost of production, making high-quality game development more accessible.

The ability to quickly change the visual style of a game with simple prompts is another benefit. This feature allows developers to experiment with different artistic directions with ease, facilitating a more dynamic and creative development process.

Further, controlling the style and consistency of the game's visuals becomes more straightforward and flexible. Developers can assign specific prompts to various objects to dictate their appearance in the final render. Additionally, fine-tuning weights can be added to ensure consistency, particularly for characters and key subjects. There's also the option to train control models on custom feature maps for objects and characters, enhancing how they interact in the game world (e.g., training a model to render specific behaviors like two objects colliding to create fireworks).

This approach is compatible with existing production workflows, making it a feasible option for many development teams. Standard game engines can still manage the challenges of physics, user control, and feedback, ensuring that the fundamental mechanics of the game remain robust and reliable. The diffusion model can be used to create 3D objects, such as through text-to-3D or image-to-3D conversions. This method can serve as the foundation for 3D conditioning in the game.

The 3D models or viewpoints used in their creation can also be utilized to fine-tune the diffusion model. This could involve directly learning new 'vocabulary' for specific objects or employing control models and additional layers, like Low-Rank Adaptation (LoRA) to generate these objects from given viewpoints directly in the image/video diffusion process.

Use Diffusion Model to Produce Scene as Meshes and Combine with Graphics Engine

In some embodiments, a diffusion model (e.g., T2I model 230) is leveraged to create detailed scenes and meshes. These scenes and meshes are then combined with a traditional graphics engine. In some embodiments, the process begins with a barebones scene, which is used to produce a coherent video or set of frames of the entire scene. These frames form the basis of training a neural representation of the environment or scene. Various sampling methods may be employed to capture the right set of frames for the neural representation. The camera matrix information may be used to help place the frames in the broader context of the scene, similar to the process used in Neural Radiance Fields (NeRF) training.

In some embodiments, for a static scene, a 360-degree video of the entire scene or each object within it is captured, resulting in a 3D neural representation. In some embodiments, if the scene includes motion, the result is a 4D neural representation, which adds a temporal component. It is beneficial for using temporal information to understand object boundaries and sub-components. For example, it could enable auto-rigging of objects. Rigging is the process of creating a skeleton for a 3D representation of an object. Each bone in the skeleton is connected to a part of the 3D mesh (the outer skin or shape of the 3D representation of the object). Auto-rigging automates the creation of this skeleton.

In some embodiments, an additional physics model is incorporated with varying object positions and interactions. In some embodiments, multiple videos are rendered with varying object positions and interactions. By incorporating an additional physics model or rendering multiple videos with varying object positions and interactions, a 5D neural representation can be produced. This representation captures the underlying physics of the scene, including how changes in parameters over time and space affect the rendered view.

In some embodiments, once the neural representation is established, it can be used to produce textured, rigged meshes suitable for a traditional graphics engine. Object detection and segmentation models play a crucial role in understanding the sub-components of each object, such as the different parts of a car model that may need to be rigged or animated separately.

In some embodiments, if certain sub-components, like the interior wall of a car, have occluded views, a diffusion model (like a text-to-3D or image-to-3D model) can be utilized to fill in these missing details.

In some embodiments, marching cubes or similar neural approaches are used to convert the neural representation into a 3D mesh.

In some embodiments, auto-rigging the objects in the scene is performed. This can be achieved using a rigging model, likely a multi-modal language model or constrained optimization model for a given object class, to assign rigs or category-oriented rigs to the produced models. If a 4D representation of the scene is available, it can be used to extract the animation for that object, which can then be applied to the rig. In cases where there is no existing motion for a rig, a motion diffusion model can be used to generate one.

Interactive (5D) Neural Representations of Scene

In some embodiments, interactive (5D) neural representations of a are generated in a digital environment, blending the boundaries between static scenes and interactive, dynamic experiences. This method involves several sophisticated techniques and processes to create highly responsive and realistic environments.

The process begins with either a 3D or 4D neural representation of the scene. The 3D representation focuses on the spatial aspects, while the 4D aspect adds the element of time, capturing motion and changes over time.

In some embodiments, re-illumination techniques are implemented. Re-illumination techniques include adjusting the lighting of the scene in post-processing. This can be performed to simulate different times of day, weather conditions, or other environmental factors that affect lighting.

In some embodiments, these re-illumination techniques can be further enhanced by combining them with neural shaders. Neural shaders use machine learning to create highly detailed and realistic textures and lighting effects, adding depth and realism to the scene.

In some embodiments, the scene is broken down into individual models and primitives. This breakdown is essential for understanding and manipulating the scene at a granular level, allowing for more detailed and specific interactions and changes.

In some embodiments, neural global illumination can be implemented to enhance the realism of lighting and shadows in the scene. Neural global illumination uses AI to simulate how light bounces off surfaces, creating realistic lighting effects that can change dynamically with the environment.

In some embodiments, user input is predicted to increase the latency budget. By anticipating the user's actions, the system can pre-emptively adjust the scene, reducing the perceived delay between user input and on-screen feedback. This involves understanding the limitations of human reaction times and controller mechanics, such as the speed at which a button can be pressed or a joystick can be moved.

In some embodiments, sections of the neural representation are re-rendered in real-time based on changes in the environment or user interaction. This requires a real-time diffusion model capable of quickly updating portions of the scene. By focusing only on the subsections that need updating, this method can be faster and more efficient than re-rendering the entire scene. It allows for dynamic and responsive environments that can change and evolve based on user interaction and other environmental factors.

Example Architecture of a T2V Model

Figure 3:
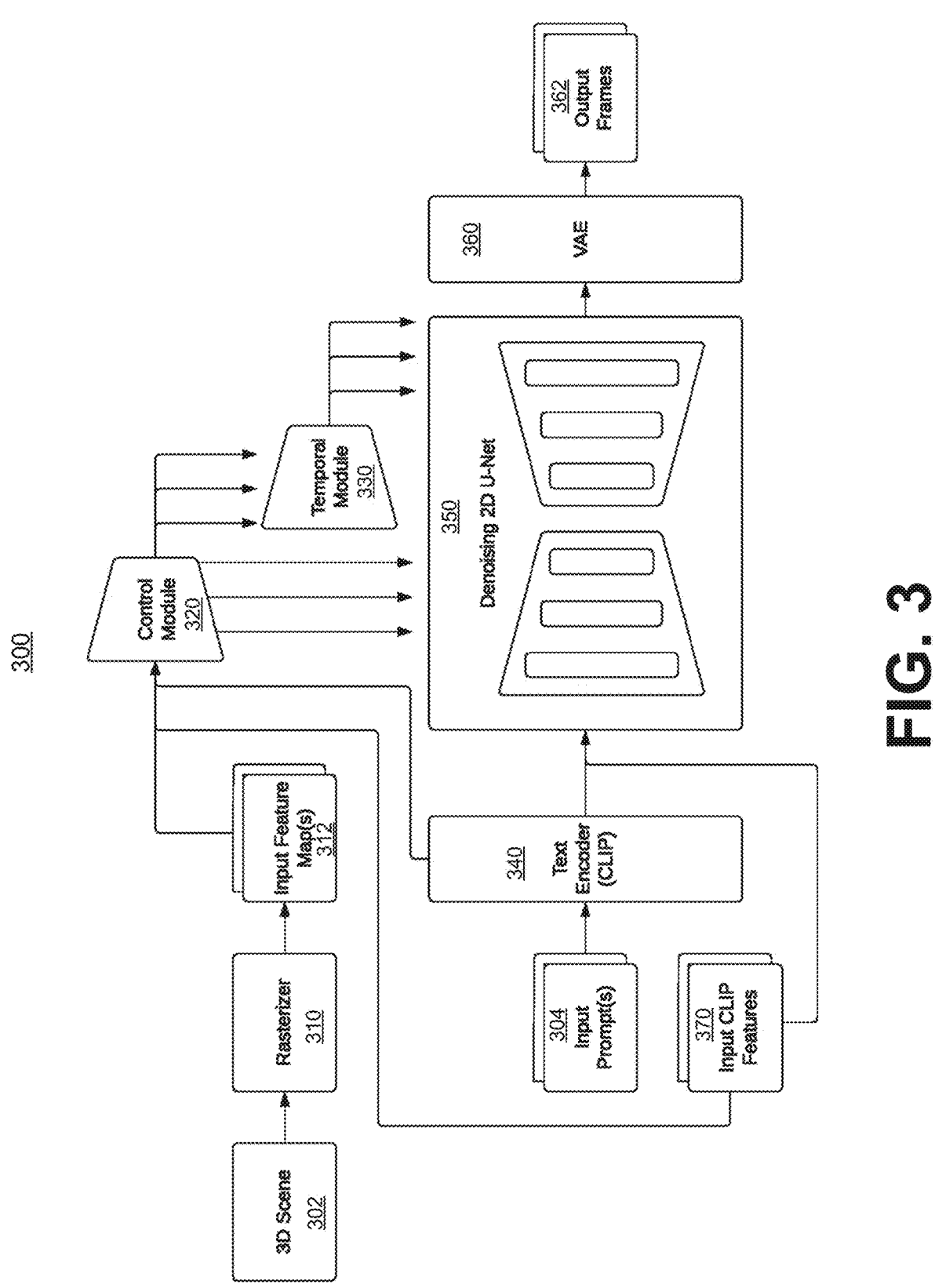
FIG. 3 illustrates an example architecture of a text-to-video (T2V) model, in accordance with some embodiments.

FIG. 3 illustrates an example architecture of a T2V model 300, which may correspond to the T2V model 240 of FIG. 2. The T2V model 300 includes a rasterizer 310, an input feature map module 312, a control module 320, a temporal module 330, a text encoder 340, a denoising 2D U-net, a variational autoencoder (VAE) 360, and an input contrastive language-image pre-training (CLIP) feature module 370. Input of the T2V module 300 is a 3D scene 302 and input prompts 304. The 3D scene 302 may include a single 3D map or a sequence of 3D maps. The text prompts 304 include text description or instructions that are used by the T2V model 300 to generate corresponding images or videos.

The rasterizer 310 is configured to convert the 3D scene 302 into a 2D image or a sequence of 2D images, and the input features map module 312 is configured to extract feature maps from the 2D images. Further, the text encoder 340 receives input prompts 304 and generates text embeddings based on the input prompts 304. CLIP feature module 370 is configured to receive the 2D maps generated by the input feature map module 312 and text embeddings generated by the text encoder 340 to generate CLIP features, which capture the semantic meanings of the input prompts 304 and rasterized images.

The feature maps (extracted by the input feature map module 312), text embeddings (extracted by text encoder 340), input clip features (extracted by the input CLIP feature module 370) are then input into the control module 320. Output of the control module 320 is input into the temporal module 330. The temporal module 330 is configured to add a temporal dimension to the process, which is for video generation as it involves sequences of frames over time. The output of the temporal module 330 and the output of the control module 320, along with the output of the text encoder 340 are also input into the denoising 2D U-Net 350. The denoising 2D U-Net 350 is configured to refine and/or improve the quality of the originally rasterized sequence of images (also referred to as "image frames"). The output of the 2D U-Net 350 is then input into the VAE module 360. The VAE module 360 is a generative model configured to output new images or frames 362.

In some embodiments, a high-speed T2V model is achieved via model distillation. During model distillation, a large, complex model is compressed into a smaller, more efficient one without significant loss of accuracy. In some embodiments, a model is distilled specifically for a particular scene, including background, environment, characters, etc. In some embodiments, a larger model is fine-tuned on the scene and then distilled into a smaller model. In some embodiments, a smaller model is distilled directly. For example, in some embodiments, the system takes and prunes a larger model, and then runs distillation. Alternatively, the system starts with a smaller base model, and runs distillation. Distillation techniques can include (but are not limited to) student/teacher distillation, adversarial distillation with a score-based discriminator, and/or multi-teacher distillation for the quality and/or accuracy of reproduced scenes. In some embodiments, the system can use separate models or Low-Rank Adaptation of Large Language Models (LoRAs) to teach distilled student models different concepts (e.g., characters, environments, etc.). In some embodiments, a general model is distilled for speed. In some embodiments, model quantization is performed to reduce precision of values used in the model's computations. In some embodiments, model quantization includes converting its floating-point weights and activations to lower precision formats, such as 16-bit integers or 8-bit integers. In some embodiments, the model is fine-tuned after quantization to recover loss in accuracy due to the reduced precision.

In some embodiments, after a 3D scene is rasterized into a 2D color map, an image-to-image model, an image-to-video model, and/or video-to-video model are implemented to add a fixed or variable amount of noise to a rasterized color map, which is then gone through a denoise process. In some embodiments, additional conditioning feature maps or vectors are provided. The additional conditioning feature maps or vectors may include (but are not limited to) text prompts, previous frame(s), and/or 2D feature maps (e.g., depth). In some embodiments, the additional conditioning feature maps or vectors are provided for either an image-to-image model, an image-to-video model, and/or a video-to-video model. For example, the image-to-video model is able to predict a next few frames based on a current frame. The video-to-video model is able to rasterize conditioning frames. In some embodiments, a control module 320 is not necessary. Instead, the system or T2V model 300 takes a rasterized color map (e.g., a 2D image in pixel format generated by the rasterizer 310), adds noise to it, and then uses this modified image as initial data for the UNet 350 to process. The UNet 350 then works to denoise or refine these initial noisy latents.

Example Process of Generating Computer Graphics

Figure 4A:
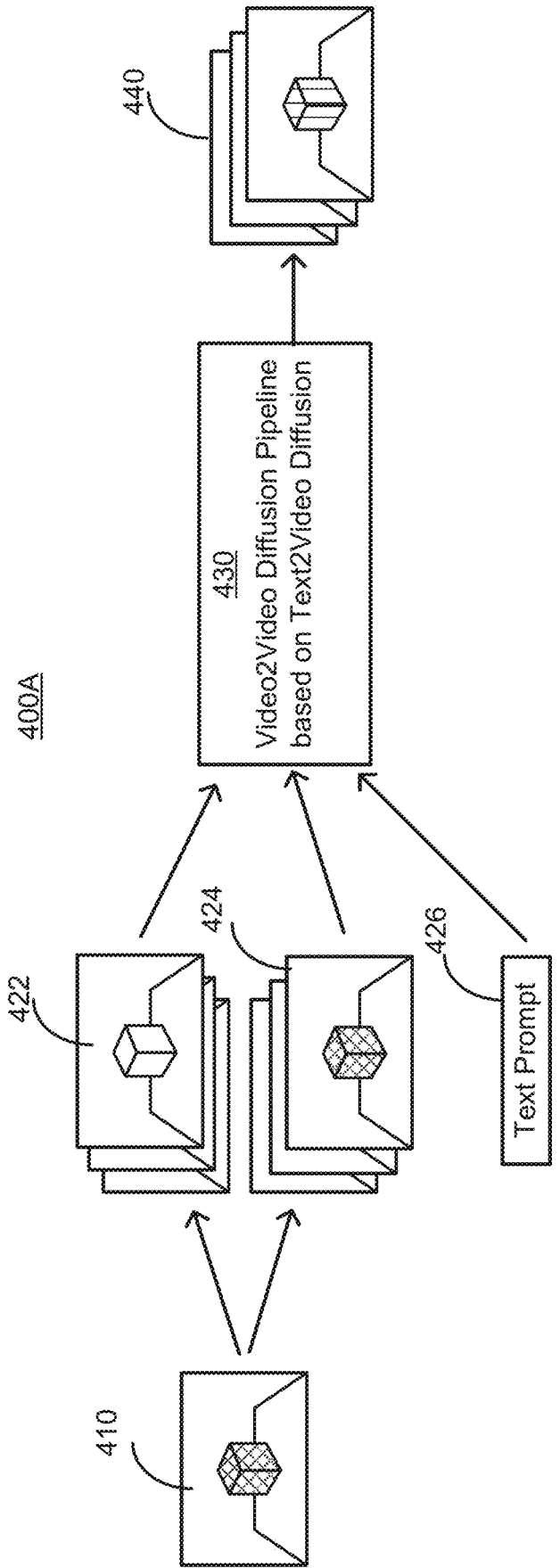
FIG. 4A illustrates an example process of generating computer graphics in accordance with some embodiments.

FIG. 4A illustrates an example process 400A of generating computer graphics in accordance with some embodiments. This process 400A may be performed by the graphic generation system 130. As illustrated in FIG. 4A, first, a sequence of images 410 is obtained. In some embodiments, the sequence of image 410 may be obtained from a client device 110. The sequence of images 410 are processed to obtain a sequence of 3D scenes 422 and 2D images 424. In some embodiments, the 2D images 424 may be generated by rasterizing the 3D scenes 422. In some embodiments, one or more text prompts may be generated based on the 2D images 424 and/or 3D scenes 422. Alternatively, one or more text prompts 426 may be input by a user. The 3D scenes, 2D images, and/or the text prompts are input into a video-to-video (video2video) diffusion pipeline based on a T2I diffusion model to generate a sequence of updated images 440. In some embodiments, the video2video diffusion pipeline may correspond to the T2V model 240 of FIG. 2. In some embodiments, the T2I diffusion model may correspond to the T2I model 230 of FIG. 2. In some embodiments, the updated images 440 have a higher resolution than the original images 410.

Figure 4B:
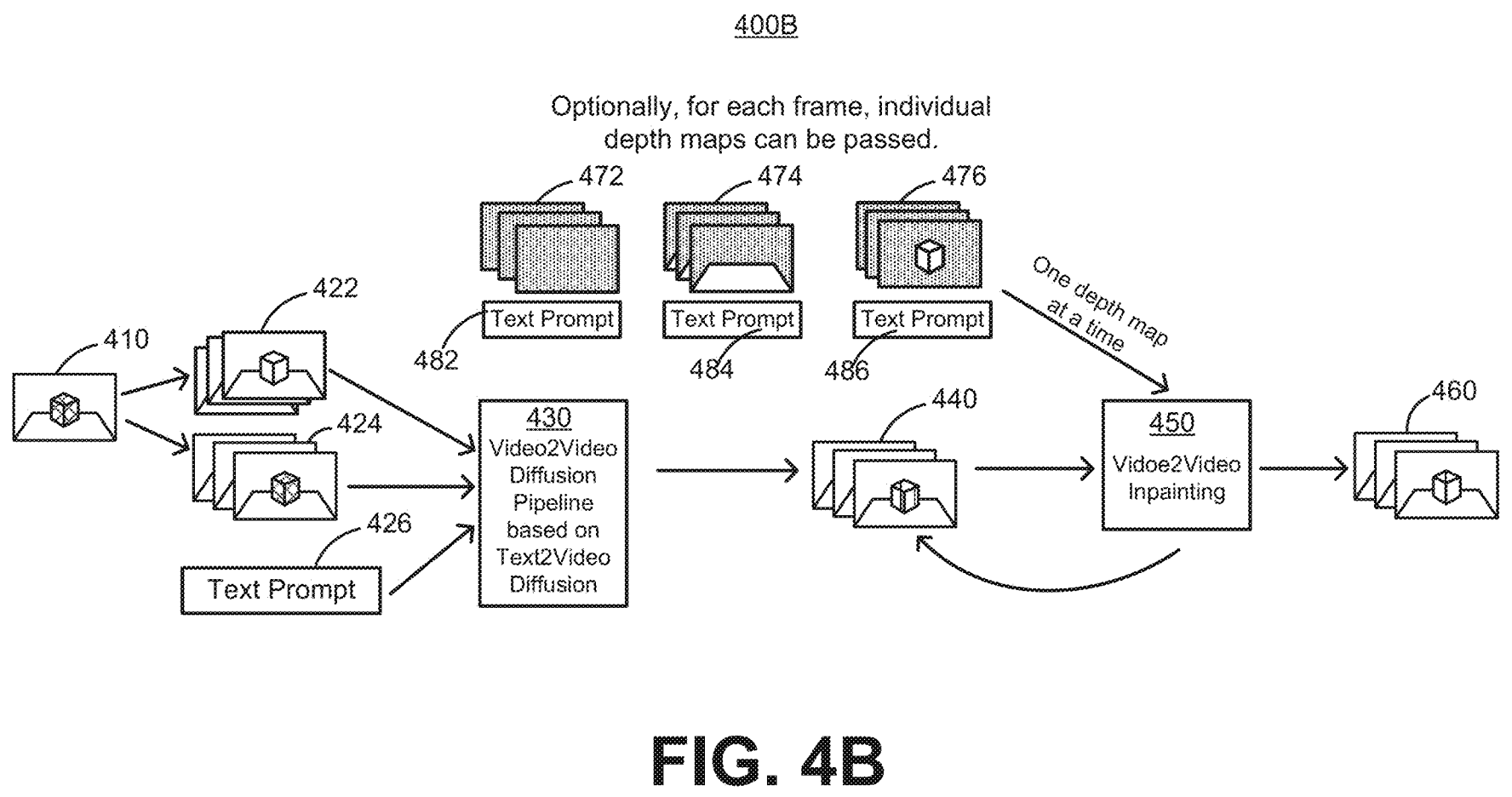

FIG. 4B illustrates another example process 400B of generating computer graphics in accordance with some embodiments. This process 400B may also be performed by the graphic generation system 130. In addition to the process 400A, the process 400B further includes passing individual depth map of each frame to a video2video inpainting model 450, which may correspond to the inpainting model 250 of FIG. 2. In some embodiments, each 3D scene is processed to identify objects in it, such as an environment, a background, an object in the environment. Each of the objects corresponds to a separate depth map 472, 474, 476 and respective text prompts 482, 484, 486. The inpainting model 450 fills in the gaps of the depth maps 472, 474, 476 to generate updated depth maps. The updated depth maps are then used to update the images 440 generated by the video2video diffusion pipeline 430 to further generate updated images 460.

FIG. 5 is a flowchart of a method 500 for generating computer graphics in accordance with some embodiments. In various embodiments, the method includes different or additional steps than those described in conjunction with FIG. 5. Further, in some embodiments, the steps of the method may be performed in different orders than the order described in conjunction with FIG. 5. In some embodiments, the method described in conjunction with FIG. 5 may be carried out by the graphic generation system 130, while in other embodiments, the steps of the method are performed by any computer system capable of receiving and processing images.

The graphic generation system 130 accesses 510 one or more 3D scenes. In some embodiments, the 3D scenes are obtained by a client device 110, which may be a game player's device. The client device 110 may include a depth camera configured to capture depth data of an environment. Alternatively, the 3D scenes may be received from a gaming system 120. The gaming system 120 may receive 2D images from the client device 110 and reconstruct a 3D scene based on the 2D images.

The graphic generation system 130 rasterizes 520 the one or more 3D scenes into a first set of one or more 2D images having a first resolution. In some embodiments, the first resolution is fairly low due to various reasons. In some cases, this may be caused by resolution of a camera on the client device. The graphic generation system 130 extracts 530 features from the first set of one or more 2D images. In some embodiments, a neural network is used extract features from the 2D images. The extracted features may include 2D maps.

The graphic generation system 130 generates 540 one or more text prompts based on the extracted features. The graphic generation system 130 applies 550 a diffusion model to the features and the one or more text prompts to generate a second set of one or more 2D images having a second resolution greater than the first resolution. In some embodiments, the diffusion model is a T2I model trained over a dataset comprising images and corresponding text descriptions. The diffusion model is trained to add additional content to the original 2D images to generate the second set of one or more 2D images, consistent with the text description. The graphic generation system 130 causes 560 the second set of one or more images to be rendered at a client device.

In some embodiments, the extracted features may be used to identify objects in the 2D images, such as an environment, a car, etc. Each of the identified objects may correspond to a text prompt. In some embodiments, for each text prompt, a set of prompt embeddings are generated based on the text prompt, and a set of latent variables are generated based on the features associated with the text prompt. The diffusion model is applied to the set of prompt embeddings and the set of latent variables to generate the second set of images.

In some embodiments, the diffusion model is a T2V model configured to take a first sequence of 2D images as input to generate a second sequence of 2D images as output. In some embodiments, to achieve near real time performance and coherence between generated images in the second sequence, the images in the first sequence are sampled, where, instead of processing contiguous chunks of frames, the system selects and diffuses frames at intervals, then stitches them together later. In some embodiments, chunks of frames with overlapping portions are processed separately to ensure coherence.

In some embodiments, the T2V model can be run at a high enough speed, such that the T2V model is caused to generate a next frame or a sequence of a few up-coming frames based on a current frame. In some embodiments, the generation of the next frame or the sequence of the few up-coming frames is condition on the current frame (and its corresponding features) and/or one or more past frames (and their corresponding features).

Computing Machine Architecture

Figure 6:
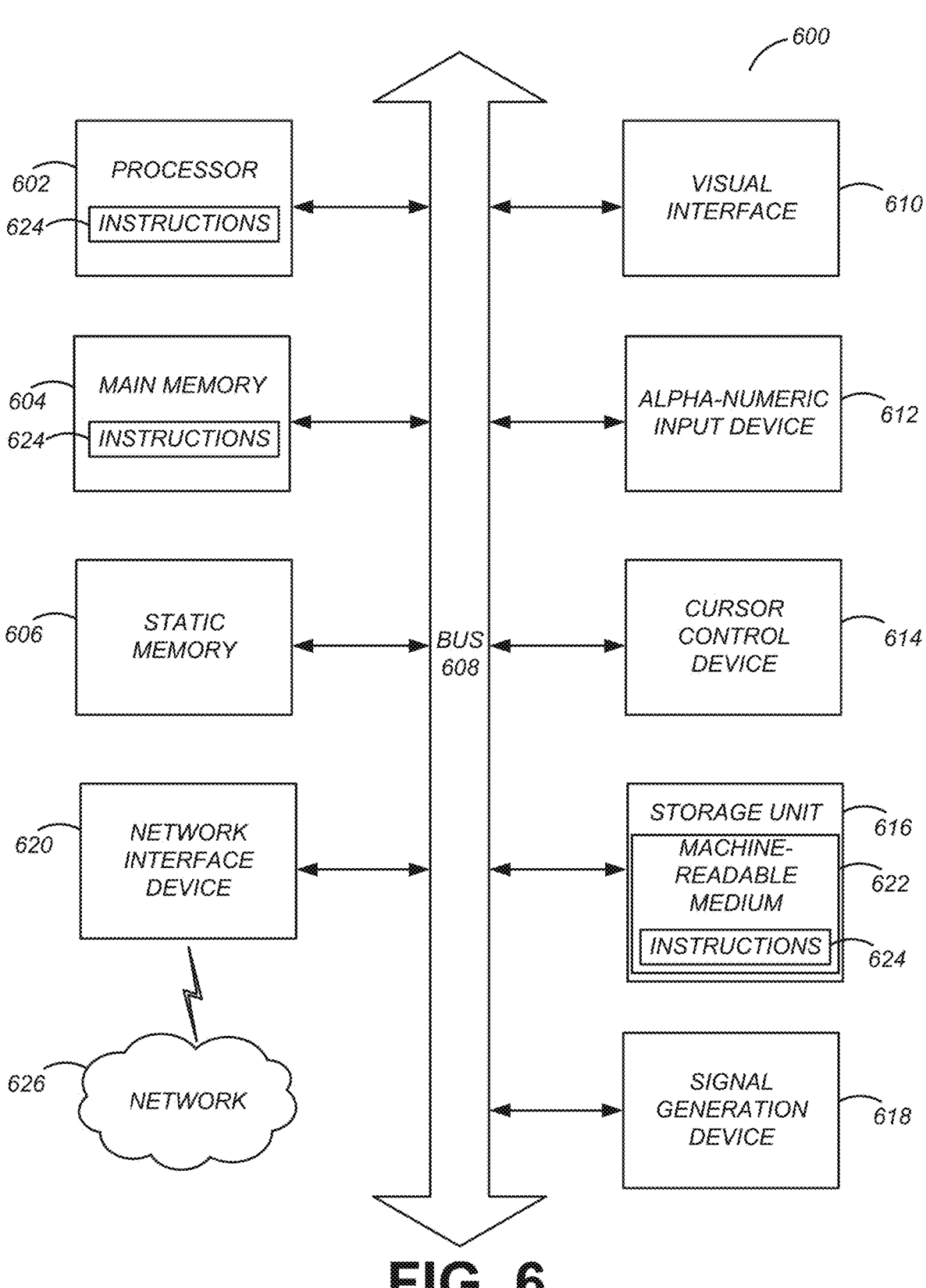
FIG. 6 is a block diagram illustrating components of an example computing system able to read instructions from a computer-readable medium and execute them in a processor (or controller).

As described above, each of the client device 110, gaming system 120, and/or graphic generation system 130 is a computing system. In particular, the graphic generation system 130 is able to read instructions from a computer-readable medium and execute them to perform the functions described above. FIG. 6 is a block diagram illustrating components of an example computing system able to read instructions from a computer-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the one or more processors 602 (e.g., within a processor's cache memory) during execution thereof by the computer system 600, the main memory 604 and the one or more processors 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "computer-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the one or more processors or processors may be located in a single location (e.g., within a home environment, an office environment or as a server farm), while in other embodiments the one or more processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. In other example embodiments, fewer or more modules may be used by the graphic generation system 120 to achieve the same or similar functionalities disclosed herein.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for performing database operations on historical travel data and analysis for virtual interline of travel routes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, from a client device, a sequence of one or more three-dimensional scenes;
   rasterizing the sequence of one or more three-dimensional scenes into a first set of one or more two-dimensional images having a first resolution;
   extracting features from the first set of one or more two-dimensional images;
   generating one or more text prompts based on the extracted features;
   for each of the one or more text prompts,
      generating a set of prompt embeddings based on the text prompt; and
      generating a set of latent variables based on the features associated with the text prompt;
   sampling the first set of one or more two-dimensional images at different times;
   applying a diffusion model to 1) the features associated with a first subset of the first set of two-dimensional images and associated with a second subset of the first set of two-dimensional images selected to overlap the first subset and 2) the one or more text prompts to generate a second set of one or more two-dimensional images having a second resolution greater than the first resolution, wherein the diffusion model is trained over a dataset comprising images and corresponding text descriptions to generate an image consistent with a text prompt, wherein the diffusion model includes a two-dimensional Unet configured to receive the extracted features from the first set of one or more two-dimensional images, the sampled first set of one or more two-dimensional images, the set of prompt embeddings, and the set of latent variables to generate the second set of one or more images; and causing the second set of one or more images to be rendered at a client device.

2. The method of claim 1, wherein the features include two-dimensional feature maps extracted by a convolutional neural network.

3. The method of claim 1, further comprising:

identifying an object based on the features extracted from the one or more two-dimensional images, wherein the one or more text prompts include a text prompt corresponding to the object.

4. The method of claim 1, further comprising:

identifying an environment based on the features extracted from the one or more two-dimensional images, wherein the one or more text prompts include a text prompt corresponding to the environment.

5. A computer program product comprising a non-transitory computer readable storage medium having instructions encoded thereon that, when executed by one or more processors, cause the one or more processors to:

receive, from a client device, a sequence of one or more three-dimensional scenes;

rasterize the sequence of one or more three-dimensional scenes into a first set of one or more two-dimensional images having a first resolution;

extract features from the first set of one or more two-dimensional images;

generate one or more text prompts based on the extracted features;

for each of the one or more text prompts, generate a set of prompt embeddings based on the text prompt; and generate a set of latent variables based on the features associated with the text prompt;

sample the first set of one or more two-dimensional images at different times;

apply a diffusion model to 1) the features associated with a first subset of the first set of two-dimensional images and associated with a second subset of the first set of two-dimensional images selected to overlap the first subset and 2) the one or more text prompts to generate a second set of one or more two-dimensional images having a second resolution greater than the first resolution, wherein the diffusion model is trained over a dataset comprising images and corresponding text descriptions to generate an image consistent with a text prompt, wherein the diffusion model includes a two-dimensional Unet configured to receive the extracted features from the first set of one or more two-dimensional images, the sampled first set of one or more two-dimensional images, the set of prompt embeddings, and the set of latent variables to generate the second set of one or more images; and cause the second set of one or more images to be rendered at a client device.

6. The computer program product of claim 5, wherein the features include two-dimensional feature maps extracted by a convolutional neural network.

7. The computer program product of claim 5, wherein the one or more processors are further caused to:

identify an object based on the features extracted from the one or more two-dimensional images, wherein the one or more text prompts include a text prompt corresponding to the object.

8. The computer program product of claim 5, wherein the one or more processors are further caused to:

identify an environment based on the features extracted from the one or more two-dimensional images, wherein the one or more text prompts include a text prompt corresponding to the environment.

9. A computer system comprising:

one or more processors; and a non-transitory computer readable storage medium having instructions encoded thereon that, when executed by the one or more processors, cause the one or more processors to:

receiving, from a client device, a sequence of one or more three-dimensional scenes;

rasterize the sequence of one or more three-dimensional scenes into a first set of one or more two-dimensional images having a first resolution;

extract features from the first set of one or more two-dimensional images;

generate one or more text prompts based on the extracted features;

for each of the one or more text prompts, generate a set of prompt embeddings based on the text prompt; and generate a set of latent variables based on the features associated with the text prompt;

sample the first set of one or more two-dimensional images at different times;

apply a diffusion model to 1) the features associated with a first subset of the first set of two-dimensional images and associated with a second subset of the first set of two-dimensional images selected to overlap the first subset and 2) the one or more text prompts to generate a second set of one or more two-dimensional images having a second resolution greater than the first resolution, wherein the diffusion model is trained over a dataset comprising images and corresponding text descriptions to generate an image consistent with a text prompt, wherein the diffusion model includes a two-dimensional Unet configured to receive the extracted features from the first set of one or more two-dimensional images, the sampled first set of one or more two-dimensional images, the set of prompt embeddings, and the set of latent variables to generate the second set of one or more images; and cause the second set of one or more images to be rendered at a client device.

* * * * *